United States Patent [19]

Bullock, Jr.

[11] Patent Number: 4,673,102

[45] Date of Patent: Jun. 16, 1987

[54] PROTECTIVE COATINGS AND METHOD FOR PROTECTING TANK CAR CONTAINERS

[76] Inventor: Thomas W. Bullock, Jr., 3321 Pines Rd., Shreveport, La. 71119

[21] Appl. No.: 700,083

[22] Filed: May 2, 1985

[51] Int. Cl.⁴ ............................................. B61D 27/00
[52] U.S. Cl. .................................. 220/457; 220/5 A; 220/444
[58] Field of Search ............... 220/455, 444, 457, 469, 220/5 A; 105/358, 360

[56] References Cited

U.S. PATENT DOCUMENTS

| | | | |
|---|---|---|---|
| 3,163,434 | 12/1964 | Krueger | 220/457 X |
| 3,295,541 | 1/1967 | Ummel | 220/457 X |
| 3,303,617 | 2/1967 | Hessburg, Jr. et al. | 105/358 |
| 3,326,141 | 6/1967 | Graves | 105/358 |
| 3,338,185 | 8/1967 | Phillips | 105/358 |
| 3,547,047 | 12/1970 | Needham | 105/358 |
| 3,687,087 | 8/1972 | Yurkoski et al. | 220/457 X |
| 3,769,118 | 10/1973 | Tariel et al. | 220/457 X |
| 3,876,739 | 4/1975 | Loveland | 105/358 X |

Primary Examiner—Steven M. Pollard

[57] ABSTRACT

A protective coating for steel vessels having polyurethane insulation sandwiched between a vessel container and an outer shell, the coating applied to the outer surface of the container and the inner surface of the shell. A method for protecting polyurethane insulated tank car and other steel vessel containers and the inside surface of the outer shell which encapsulates the containers, which includes the steps of preparing the outer surface of the container and the inside surface of the outer shell and coating the outside and inside surfaces with a protective coating such as a lead and chrome-free polyamide epoxy to prevent corrosion and pitting.

12 Claims, 2 Drawing Figures

PROTECTIVE COATINGS AND METHOD FOR PROTECTING TANK CAR CONTAINERS

BACKGROUND OF THE INVENTION

1. Field of the Invention

This invention relates to the corrosion protection of steel tank car containers or pressure vessels, as well as other vessels utilizing polyurethane foam insulation and more particularly, to the protection of the outer surface of the tank car container or pressure vessel and the inside surface of the outer shell which encapsulates the container. The method of this invention includes preparing the outer surface of a steel container or pressure vessel and the inner surface of the outer shell by techniques known to those skilled in the art and applying a coating of corrosion-inhibiting material such as a lead and chrome-free polyamide epoxy to prevent pitting and corrosion of the outer and inner surfaces, respectively. The polyamide coating is compatible with polyurethane foam insulation which is commonly used to insulate tank cars and other vessels and is designed to inhibit corrosion resulting from the interaction of water vapor with certain constituents of the polyurethane foam material during operation of the tank car. The protective coating can be utilized regardless of the tank car service and regardless of the thickness or density of the polyurethane insulation located between the pressure vessel or container wall and the outer shell.

2. Description of the Prior Art

Department of transporation specifications for pressure tank car tanks (classes DOT-105, 109, 112 and 114) require that the exterior surface of a carbon steel tank or container and the inside surface of a carbon steel jacket or shell must be given a protective coating, except "that a protective coating is not required when foam-in-place insulation that adheres to the tank or jacket is applied". Various coating methods for protecting tank cars are known to those skilled in the art. U.S. Pat. No. 3,110,610, dated Nov. 12, 1963, to R. H. Goodell, describes a "Coating Method" for coating the inside surface of a tank car container or pressure vessel. The method includes pre-drying the interior of the tank with warm gases for a period of two to six hours and subsequently applying a series of four to eight liquid resin coatings, drying each coat with warm gases to a nontacky state and baking the interior with warm gases for a period of from six to twenty hours. Various techniques for foaming the annulus between the outer surface of a pressure vessel or container such as a tank car container and the inner surface of the outer skin or shell are also known to those skilled in the art. U.S. Pat. No. 3,687,087, dated Aug. 29, 1972, to Frank R. Yurkoski discloses an "Insulating Structure for Interior of Railway Freight Cars". The disclosed insulating structure includes a layer of polyurethane foam material having its outer surface secured to the inner surface of the metallic car body and an elastomeric inner liner secured to the inner surface of the polyurethane foam material. The structure is designed to compensate for unusually high local stresses such as those realized from a tool or a workman within the car, with the intermediate foam layer deformed permanently while the elastomeric inner layer remains undamaged. An "Insulated Railway Tank Car and Method of Forming Same" is disclosed in U.S. Pat. No. 3,547,047, to Robert F. Needham. This patent includes a plurality of circumferential dividers secured to the inner container before the inner container is telescoped within an outer shell. After positioning of the inner container within the outer shell, the dividers form a plurality of compartments which are subsequently filled with a foamed-in-place, cellular insulating material. U.S. Pat. No. 3,876,739, dated Apr. 8, 1975, to Arthur F. Loveland discloses a "Method of Applying a Rigid Polyurethane Foam to the Exterior of a Railway Car". In this method a plastic or metal sheet is first applied to the interior of a mold and the mold is then secured to the car and is spaced about three inches from the sides of the car. A foamed cellular plastic such as a polyurethane foam is introduced into the space or cavity between the mold and the outer surface of the side sheets. After the foaming reaction has taken place and the foam has filled the cavity, the mold may be removed and the car moved to an adjacent area for foaming. The outer surface of the car thus foamed is even and smooth to facilitate painting and stenciling.

In light of the Department of Transportation regulations for protecting tank car containers or pressure vessels and the known art for applying insulating foam to the tank cars, applicant is unaware of any requirements for applying a protective coating to the outer surface of a container or pressure vessel or to the inside surface of the cooperating skin or outer shell, when foamed-in-place insulation is to be applied. However, it has surprisingly been found that pitting and corrosion of the outside surfaces of inner tank car containers or pressure vessels, as well as the inside surfaces of the outer shells has occurred, even under circumstances where polyurethane foam has been applied to the pressure vessel or container. Since this insulation contains Freon 11, Freon 12, a fire retardant known as trichloro propyl phosphate and other chemicals, certain reactions take place when water enters the insulation. Water frequently enters the insulation by way of condensation on the steel surfaces prior to insulation and during use of the tank car, particularly under circumstances where the tank car is refrigeratedd. Water which migrates into the insulation during use of the car reacts with the freon 11 ($CCl_3F$), freon 12 ($CCl_2F_2$) and/or the trichloropropyl phosphate ($PCl_3C_3H_7$) to form hydrochloric acid (HCl), hydrofluoric acid (HF), phosphoric acid ($H_3PO_4$) and/or carbonic acid ($H_2CO_3$). Accordingly, the hydrochloric acid, hydrofluoric acid, phosphoric acid and carbonic acid which are formed as a result of this water migration and reaction of the water molecules with the Freon 11, Freon 12 and the fire retardant trichloro propyl phosphate outer metal skin of the pressure vessel, react with the carbon steel container and shell to cause pitting and corrosion of the container and shell. The most vigorous attack on the carbon steel surfaces is realized as a result of the formation of hydrochloric acid. This acid attack explains the corrosion and pitting of the carbon steel outer container surface and inner shell surface when the eleven gauge steel shell and foamed-in-place insulation is removed from a vessel which has been in service for a number of years. The corrosion and pitting are most prevalent near the bottom of the container and shell, because as the car moves along the track, vibration shifts the condensed water and acid to the bottom of the tank, thus causing a higher liquid concentration in the bottom of the insulated annulus formed by the outer surface of the container and the inner surface of the shell.

The solution to this problem lies in the application of a protective coating to the exterior surface of the pressure vessel or tank car container and optionally, to the interior surface of the outer shell prior to application of a polyurethane insulating foam in the annulus between the pressure vessel or container and the outer shell. It is an object of this invention to provide a protective coating on the outer surface of a carbon steel vessel, pressure vessel or tank car container which is provided with polyurethane insulation, in order to prevent corrosion and pitting of the outer surface.

Another object of this invention is to provide a method of applying a protective coating to the exterior surface of a polyurethane insulated steel vessel, tank car container or pressure vessel and the inner surface of a protective steel liner or shell disposed around the vessel container or pressure vessel to protect the protective liner and the vessel, pressure vessel or container from pitting and corrosion.

Another object of this invention is to provide a protective coating for the outer surface of steel vessels of various description, including tank car pressure vessels or containers and the interior surface of cooperating steel liners or shells in advance of application of polyurethane insulation, in order to minimize or prevent the pitting and corrosion of the outer and interior surfaces, respectively, due to the reaction of water vapor with certain ingredients in the polyurethane insulation.

Still another object of this invention is to provide a method for protecting the outer surface of a carbon steel pressure vessel or tank car container which is insulated with polyurethane foam, which method includes the steps of preparing the outer surface and applying a protective coating to the outer surface in advance of applying polyurethane insulation to the outer surface.

A still further object of the invention is to provide a method for protecting the outer surface of a steel pressure vessel or tank car container and the inner surface of an outer liner or shell encapsulating the pressure vessel, which method includes the steps of sandblasting or otherwise preparing the outer surface of the pressure vessel and the inner surface of the shell and applying a protective coating to the outer and inner surfaces, respectively, in advance of applying foaming polyurethane insulation in the annulus between the outer surface of the container and the inner surface of the shell.

SUMMARY OF INVENTION

These and other objects of the invention are provided in a protective coating for the outer surface of a carbon steel tank car, pressure vessel or container and the inner surface of the liner or shell in cooperation with the pressure vessel or container, under circumstances where a polyurethane foam insulation is applied in the annulus between the outer surface and the inner surface. A method for protecting the outer surface of a steel tank car pressure vessel or container and the inner surface of a liner or shell surrounding the pressure vessel or container, which includes the steps of preparing the outer surface of the pressure vessel or container and the inner surface of the shell and applying a lead and chrome-free polyamide epoxy coating to the outer surface of the pressure vessel or container and the inner surface of the shell.

BRIEF DESCRIPTION OF THE DRAWING

The invention will be better understood by reference to the accompanying drawing wherein.

DESCRIPTION OF THE PREFERRED EMBODIMENTS

Figure 1:
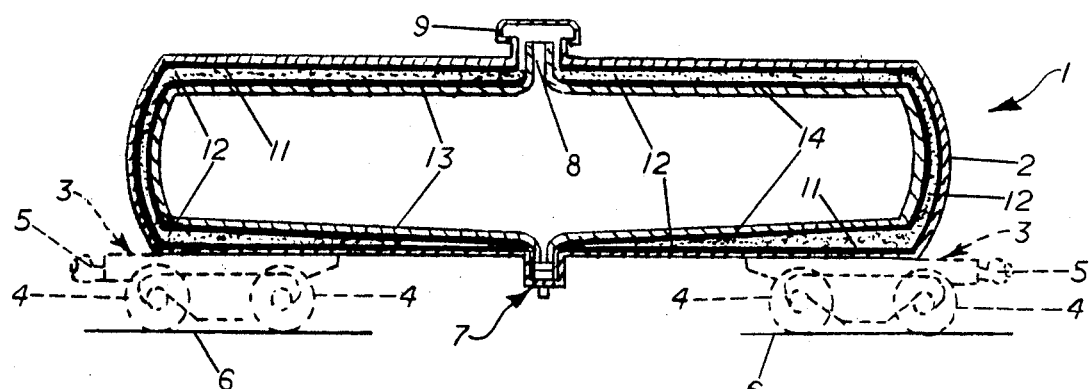
FIG. 1 is longitudinal sectional view of a typical tank car showing the protective coating in place.
Figure 2:
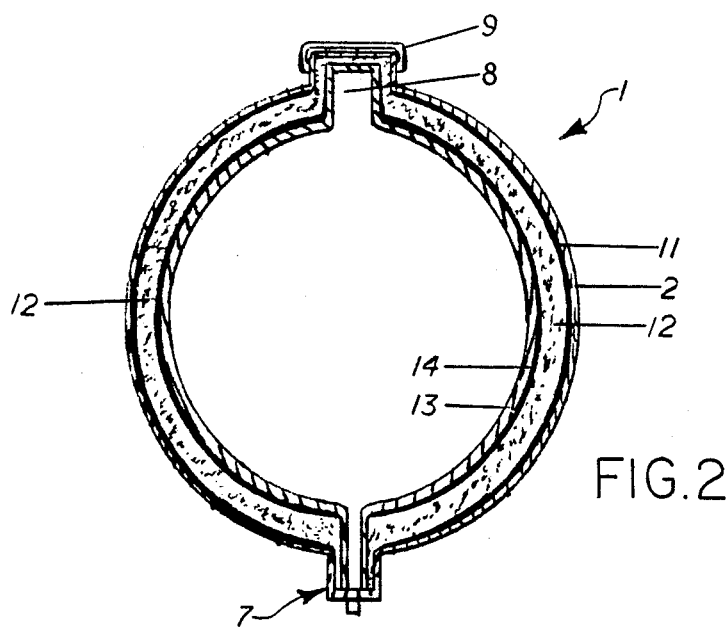
FIG. 2 is a cross-section of a typical tank car, also showing the protective coating in place.

Referring now to FIGS. 1 and 2 of the drawings, a railway tank car of conventional design is generally illustrated by reference numeral 1. The railway tank car 1 includes an outer shell 2, supported by a running gear 3 at both ends, which running gear 3 is further characterized by wheels 4, resting on rail 6, and couplers 5. A container 13, which is located inside the outer shell 2, is spaced from the outer shell 2 by a layer of polyurethane insulation 12, located between the outer shell 2 and the container 13. A shell protective coating 11 is provided on the inside surface of the outer shell 2 and a container protective coating 14 is provided on the outer surface of the container 13, as illustrated. It will appreciated that both the shell protective coating 11 and the container protective coating 14 are designed to shield the inside surface of the outer shell 2 and the outside surface of the container 13 from contact with the polyurethane insulation 12. This shielding is necessary, since water vapor from the atmosphere permeates the polyurethane insulation 12 and condenses on the inner surface of the outer shell 2 and the outer surface of the container 13, to react with certain comstituents of the polyurethane insulation 12 and produce acids, as hertofore described. These acids are usually characterized by hydrochloric acid, hydrofluoric acid, phosphoric acid and carbonic acid and are formed by chemical reaction between the water vapor and certain freon and fire retardant components in the polyurethane insulation 12, which causes pitting and corrosion of the inner surface of the outer shell 2 and the outer surface of the container 13. Accordingly, the shell protective coating 11 and the container protective coating 14 are designed to eliminate or at least minimize this chemical attack.

It will be appreciated by those skilled in the art that there are many protective coatings which can be used to protect the inner surface of the outer shell 2 and the outer surface of the container 13 according to the teaching of this invention. However, in a preferred embodiment of the invention, both the shell protective coating 11 and the container protective coating 14 are characterized by a polyamide epoxy and more particularly, a lead and chrome-free polyamide epoxy such as Number 920 Y 137 or 920 Y 143 polyamide epoxy, produced by Cook Paint and Varnish Company of Kansas City, Mo. While one coat of the shell protective coating 11 and container protective coating 14 provide good protection to both the inside surface of the outer shell 2 and the outside surface of the container 13, in a most preferred embodiment of the invention two such coats are applied, the second coat after thorough drying and curing of the first coat. Both coats should be in a thickness of at least about 3 mils and should be applied only after the inner surface of the outer shell 2 and the outer surface of the container 13 are properly prepared for painting. Preparation of the inner surface of the outer shell 2 and the outer surface of the container 13 can be effected according to substantially any technique known to those skilled in the art but in a most preferred embodiment, sandblasting is the technique or choice. The polyamide epoxy should be applied soon after the sandblasting or other surface treatment is undertaken, in order to insure good adherence between the epoxy and the surface to which the epoxy is applied.

It will be appreciated by those skilled in the art that application of the container protective coating 14 is normally applied as a first step in chemically protecting new railway tank cars 1 before the outer shell 2 has been installed, or in old railway tank cars 1 which are in the process of being refurbished, when the outer shell 2 and the polyurethane insulation 12 have been stripped away. Accordingly, the outer surface of the container 13 can be sandblasted or otherwise prepared for painting during construction or refurbishing of the railway tank car 1 and the container protective coating 14 sprayed or otherwise applied by conventional techniques after the surface is properly prepared. One or more coats of the polyamide epoxy or other protective coating material can be applied as heretofore described, and the inside surface of the outer shell 2 then treated and painted with the polyamide epoxy or other protective coating by conventional techniques. As in the case of the container protective coating 14, the shell protective coating 11 can be applied in one or more coats with proper drying and curing between coats and the outer shell 2 can then be installed on the railway tank car 1 in conventional manner. The polyurethane insulation 12 can then be foamed-in-place in the annulus between the inner surface of the outer shell 2 and the outer surface of the container 13 by conventional techniques known to those skilled in the art. Since the polyurethane insulation 12 contacts only the shell protective coating 11 and the container protective coating 14 and not the bare metal of the carbon steel outer shell 2 and the container 13, acids which form as a result of water infiltration into the polyurethane insulation 12 have no effect on either the outer shell 2 or the container 13.

While the preferred embodiments of the invention have been described above, it will be recognized and understood that various modifications may be made therein and the appended claims are intended to cover all such modifications which may fall within the spirit and scope of the invention. For example, it will be appreciated that the protective coating and method of this invention can be used to protect any carbon steel vessel having a container and an outer shell with an annulus filled with polyurethane insulation, or any insulation which contains chemicals that are reactive with water to form acids. The choice of protective coating will be dictated by the insulation chosen and the acid or acids which may be formed due to water encroachment into the insulation.

Having described my invention with the particularity set forth above, I claim:

1. In a steel vessel having a carbon steel container, a carbon steel outer shell surrounding the container and polyurethane insulation located between the container and the outer shell, the improvement in combination therewith comprising at least one coat of a first protective coating on the outside surface of the container and lying adjacent the polyurethane insulation said protective coating being properly dried and cured before the polyurethane insulation comes into contact therewith, said protective coating being able to withstand contraction and expansion of said container due to thermal variations and said protective coating effectively isolating said container from said polyurethane insulation, thus preventing water, generated by condensation, and acid, produced by a reaction between water and the polyurethane insulation, from coming into contact with and damaging the outside surface of said container.

2. The vessel of claim 1 further comprising at least one coat of a second protective coating on the inside surface of said outer shell and lying adjacent the polyurethane insulation.

3. The vessel of claim 1 wherein said at least one coat of said first protective coating is two coats of said first protective coating.

4. The vessel of claim 2 wherein said at least one coat of said second protective coating is two coats of said second protective coating.

5. The vessel of claim 2 wherein said at least one coat of said first protective coating is two coats of said first protective coating and said at least one coat of said second protective coating is two coats of said second protective coating.

6. The vessel of claim 2 wherein said protective coating is a substantially lead and chrome-free polyamide epoxy coating.

7. The vessel of claim 2 wherein said first protective coating is a substantially lead and chrome-free polyamide epoxy coating and said second protective coating is a substantially lead and chrome-free polyamide epoxy protective coating.

8. The vessel of claim 1 wherein said first protective coating is a substantialy lead and chrome-free polyamide epoxy coating.

9. In a method of insulating a vessel with polyurethane insulation, said method consisting of foaming the polyurethane insulation in place between the carbon steel container and outer shell of the vessel, the improved step comprising applying at least one first protective coating to the outer surface of the container prior to foaming the polyurethane insulation said protective coating being properly dried and cured before the polyurethane insulation comes into contact therewith, said protective coating being able to withstand contraction and expansion of said container due to thermal variations and said protective coating effectively isolating said container from said polyurethane insulation, thus preventing water, generated by condensation, and acid, produced by a reaction between water and the polyurethane insulation, from coming into contact with and damaging the outside surface of said container.

10. The method according to claim 9 further comprising the step of applying at least one second protective coating to the inner surface of the outer shell prior to foaming the polyurethane insulation.

11. In a method of insulating a railway tank car having a carbon steel container and a carbon steel outer shell surrounding the container, with an annulus between the outer surface of the container and the inner surface of the outer shell, the method consisting of foaming polyurethane foam insulation in the annulus, the improved step comprising applying at least one first protective coating to the outer surface of the container prior to foaming the polyurethane foam insulation said protective coating being properly dried and cured before the polyurethane insulation comes into contact therewith, said protective coating being able to withstand contraction and expansion of said container due to thermal variations and said protective coating effectively isolating said container from said polyurethane insulation, thus preventing water, generated by condensation, and acid, produced by a reaction between water and the polyurethane insulation, from coming into contact with and damaging the outside surface of said container.

12. The method according to claim 11 further comprising the step of applying at least one second protective coating to the inner surface of the outer shell prior to foaming the polyurethane foam insulation.

* * * * *